United States Patent [19]
Wharton et al.

[11] 3,992,173
[45] Nov. 16, 1976

[54] AIR FILTER AND METHOD OF MAKING SAME
[75] Inventors: Charles E. Wharton, Lake Forest; Clarence Bell, Chicago, both of Ill.
[73] Assignee: Korhumel Industries, Inc., Chicago, Ill.
[22] Filed: Apr. 24, 1975
[21] Appl. No.: 571,382

[52] U.S. Cl..................................... 55/501; 55/524; 55/DIG. 5; 55/DIG. 31; 156/216; 156/226; 156/227
[51] Int. Cl.²........................................ B01D 46/10
[58] Field of Search............ 55/501, 502, 511, 514, 55/515, 518, DIG. 31, DIG. 5, 524; 156/216, 227, 226; 210/495

[56] References Cited
UNITED STATES PATENTS

| | | | |
|---|---|---|---|
| 2,138,874 | 12/1938 | Myers | 55/DIG. 31 |
| 2,687,781 | 8/1954 | Sens | 55/514 |
| 2,715,453 | 8/1955 | Lange | 55/514 X |
| 2,877,863 | 3/1959 | Lorie | 55/514 |
| 3,306,328 | 2/1967 | Markus | 156/227 X |
| 3,429,434 | 2/1969 | Hickin | 55/DIG. 31 |

Primary Examiner—Frank W. Lutter
Assistant Examiner—David L. Lacey
Attorney, Agent, or Firm—Hill, Gross, Simpson, Van Santen, Steadman, Chiara & Simpson

[57] ABSTRACT

An air filter of the type having a porous filter medium body layer supported in a complementary unitary frame has a perforated panel supportingly engaging one face of the layer with folded up narrow panels along the edges of the layer, narrow retainer panels overlying the margins of the opposite face of the layer from the perforated panel, and each of the retainer panels being provided with spaced extensions which overlap adjacent the corners of the layer and are secured together as by means of adhesive, there also being anchoring adhesive securing two of the retainer panels to the filter layer. The overlapping extensions are perforated.

An efficient method of making the air filter is provided.

19 Claims, 7 Drawing Figures

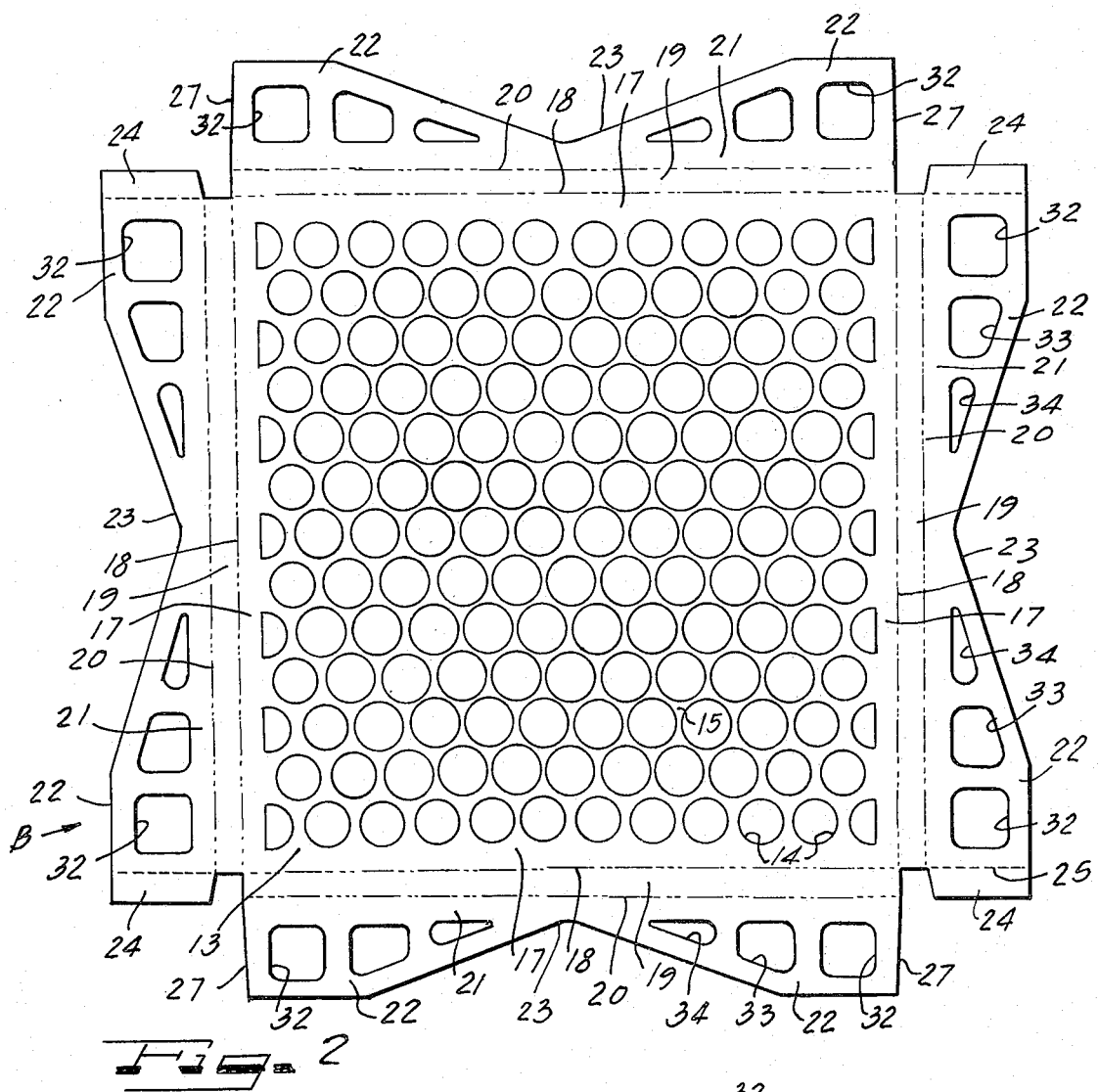
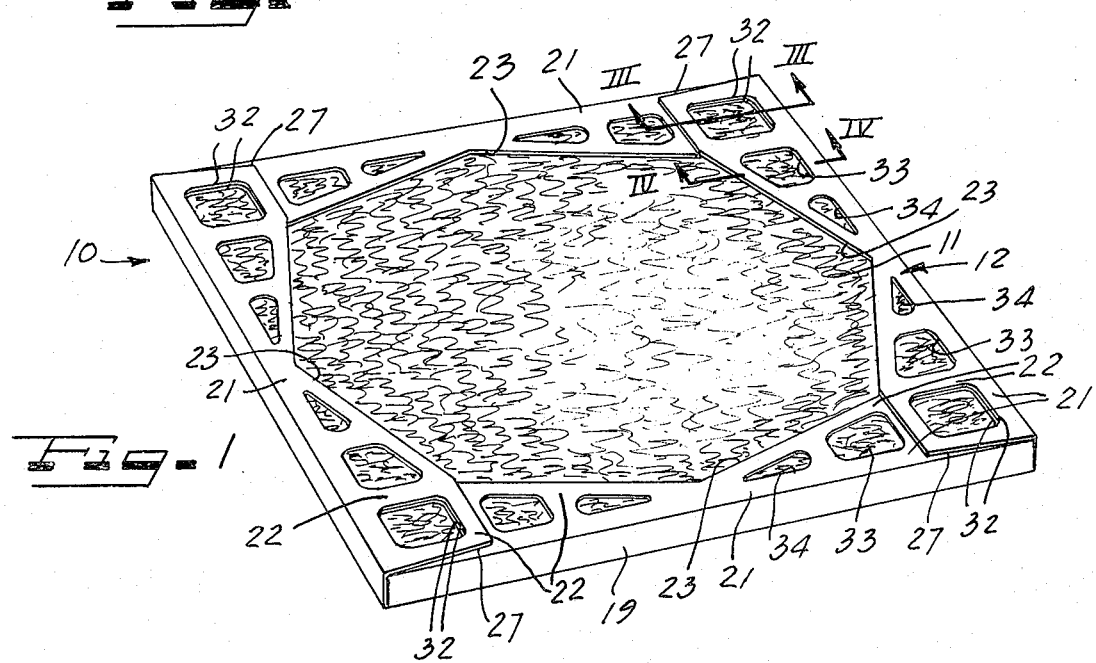

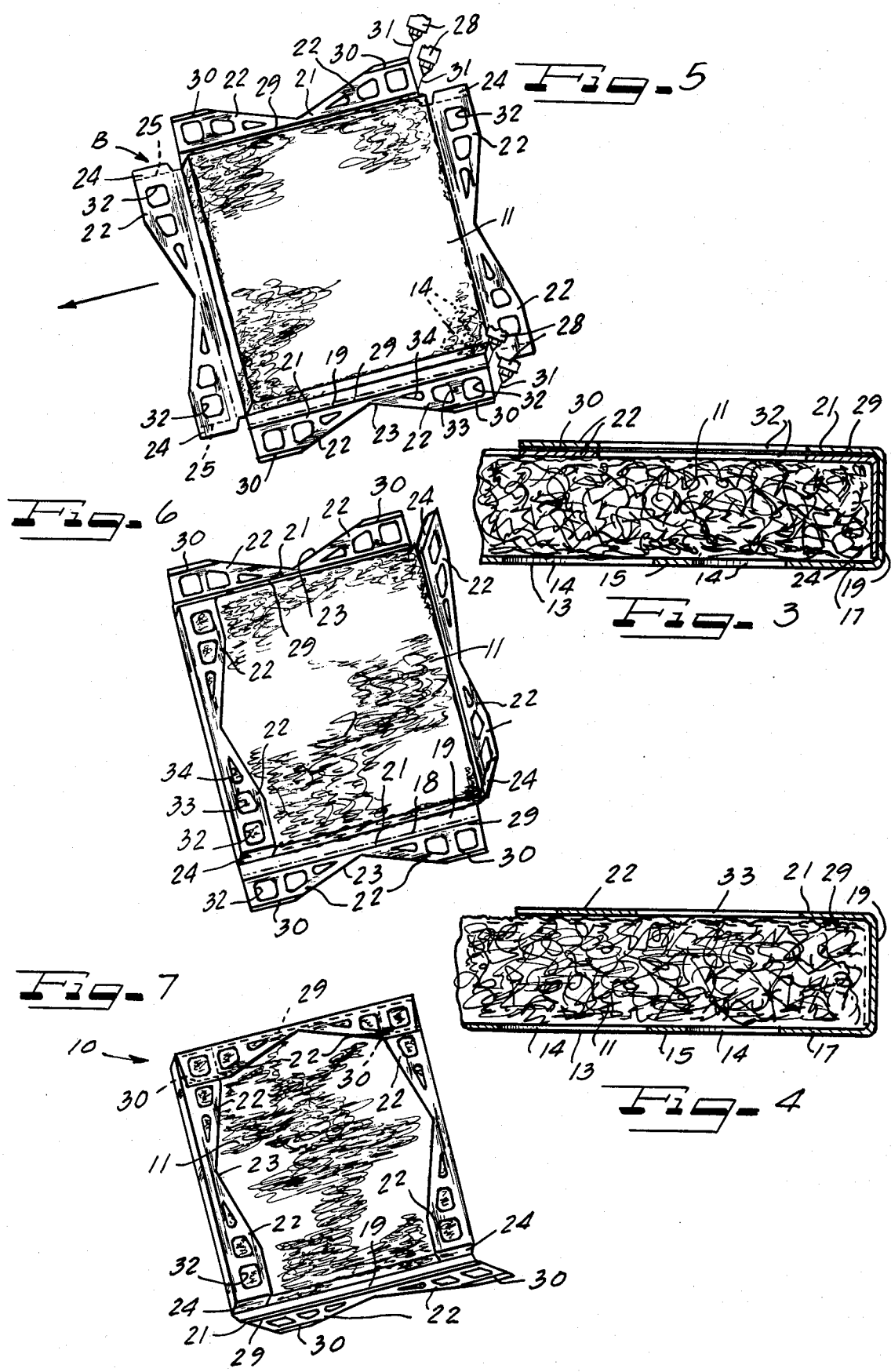

AIR FILTER AND METHOD OF MAKING SAME

This invention relates to air filters and method of making same and is more particularly concerned with air filters of the type commonly used in air circulation apparatus, including hot air furnaces, air conditioners, and the like, and generally replaced with some frequency. Numerous and varied disposable air filters have hereto been disclosed and some have enjoyed rather large volume success. Some air filters have been constructed in a manner to enable cleaning and reuse. However, the kind of air filters with which the present invention is concerned are of the popular disposable or throw-away type which are used for a given period of time, such as a heating season or an air conditioning season, or at least for a particular period of time and then discarded. However, increasing production costs, including especially labor and materials have forced critical attention to cost reduction without impairment of efficiency.

In general, air filters of the type contemplated have a porous filter medium of substantial thickness provided with four edges and comprising a fluffy mass of glass fibers generally bonded together where they touch one another by means of a suitable hardened plastic bonding material. A complementary frame is provided to support the filter layer.

An example of an early form of air filter embodying glass fiber filter medium is found in U.S. Pat. No. 2,677,436 showing a frame consisting of I-beams and skeletonized wire network panels covering the opposite faces of the filter layer. This is a costly construction and the perforated or skeletonized facing sheet on the air receiving face of the filter significantly reduces the capacity and efficiency of the filter unit.

More recently the advantage of leaving at least one face of the filter layer for substantially free entry of air has been appreciated as represented, for example, in U.S. Pat. No. 3,023,839 wherein, as a matter of fact, provision is made for having both faces relatively unimpeded. This, however, has required rather complex manufacturing facilities and a special construction of the frame squeezed or crimped onto the margins of the filter layer and thoroughly secured so as to prevent blowout.

In a more recent example of patent disclosure, represented in Pat. No. 3,747,773, an arrangment is shown wherein four separate frame pieces are secured by stripes of thermoplastic hot melt adhesive by which the frame members are adhered to the edge portions of perforated screens on both faces of the filter layer. This is an expensive construction and reduces efficiency of the filter by covering both faces with a perforated screen.

An important object of the present invention is to provide a new and improved air filter and method of making the same which will overcome the disadvantages, deficiencies, inefficiencies, shortcomings and problems in prior air filters of the type having a porous filter medium layer supported in a complementary frame.

Another object of the invention is to provide an economical, efficient air filter involving a bare minimum of parts which can be easily assembled in mass production to provide a rugged unit for the intended purpose.

A further object of the invention is to provide a new and improved air filter in which a porous filter medium layer of substantial thickness is supported in a complementary unitary frame folded up from a single blank of sheet material.

Still another object of the invention is to provide a new and improved method of making an air filter from a porous filter medium layer and a complementary frame folded up from a single blank of sheet material.

According to features of the invention, an air filter is provided having a porous filter medium body layer of substantial thickness and having a plurality of angularly related edges defining corner areas of the layer, the layer being supported in a complementary unitary frame folded up from a single blank of sheet of material, the frame comprising a perforated main panel supportingly engaging one face of the filter medium layer and having boundaries the extent of which substantially correspond to the extent of the filter layer edges. Along each boundary of the perforated main panel a narrow panel of substantially the same width as the thickness of the filter medium is folded up into face-to-face relation to the contiguous filter medium layer edge. A respective retainer panel connected along the distal end of each of the narrow panels is folded over into spaced relation to the perforated main panel and onto the filter medium layer. Each of the retainer panels has a central cutout providing a substanial gap such that at the opposite sides of the gap the retainer panel has respective coplanar flange extensions. The flange extensions of contiguous retainer panels overlap one another over corner areas of the filter medium layer and are secured to one another. The major area of the filter medium layer between the retainer panels and the flange extensions is freely exposed to receive air, and the overlapping flange extensions are preferably perforated to provide large air holes therethrough. Stripes of adhesive along the inner faces of the retainer panels at two opposite sides of the filter unit provide adherent anchorage for the filter layer supplemental to retention of the layer provided by the retainer panels and the filter layer corner engaging extensions.

According to a preferred method of making the air filter, the porous filter medium layer is placed with one face in supporting engagement with the perforated panel of the frame, the narrow boundary panels are folded up along the edges of the filter layer, the layer retainer panels are folded over onto the adjacent margins of the filter layer and the gap-separated extensions are overlapped over the corner areas of the filter layer and secured together. Securement of the overlapping extensions is effected by providing stripes of adhesive such as hot melt adhesive onto the extensions which are placed into overlapping relation onto the remaining extensions, and stripes of the adhesive along at least the retainer panels on which the extensions receive stripes of the adhesive are pressed against the associated margins of the filter layer and provided retaining anchorage for the layer supplemental to the retention afforded by the retainer panels and the extensions.

Other objects, features and advantages of the invention will be readily apparent from the following description of a preferred embodiment thereof, taken in conjunction with the accompanying drawings although variations and modifications may be effected without departing from the spirit and scope of the novel concepts embodied in the disclosure, and in which:

FIG. 1 is a perspective view of a filter unit embodying features of the invention;

FIG. 2 is a plan view of a one piece, single blank of sheet material providing the complementary supporting unitary frame for the filter unit;

FIG. 3 is an enlarged fragmentary sectional detail view taken substantially along the line III—III of FIG. 1;

FIG. 4 is a fragmentary sectional detail view taken substantially along the line IV—IV of FIG. 1;

FIG. 5 is a schematic isometric view illustrating steps in the making of the filter;

FIG. 6 is a schematic isometric view illustrating additional steps in the method of making the filter; and FIG. 7 is an isometric view illustrating final steps in making the filter.

An air filter 10 (FIG. 1) embodying features of the invention comprises a porous filter medium layer 11 of substantial thickness and provided with four edges, supported by a complementary unitary frame 12 folded up from a single blank (FIG. 2) of sheet material. Although the filter body or layer 11 may comprise any preferred fibrous filter material combination of materials, in a preferred form it is of the conventional type comprising a continuous mass of loosely matted glass fibers bonded together where they touch one another by suitable hardened plastic material so that the mat can be readily handled. Although the supporting frame 12 may be formed from any suitable foldable sheet material, in a low cost economical construction, where the filter 10 is to be discarded after use, the blank B for the same frame may be made from suitable gauge carboard. For example where the filter 10 is provided in a 20 × 20 × 1 inches size, cardboard of a thickness of about 0.028 inch has been found suitable for the purpose.

In a preferred construction, the blank B comprises a perforated body or main panel 13 provided with a uniform pattern of air passage apertures 14, preferably of circular outline and as closely spaced as practicable to leave a continuous supportive skeleton 15 of minimum practical area continuous solid margins 17 which are as narrow as practical within four-sided boundaries 18 the extent of which substantially corresponds to the extent of the four edges of the filter layer 11. In this instance the boundaries 18 are score lines which may be partially incised to promote foldability, and which score lines connect respective narrow panels 19 of substantially the same width as the thickness of the filter layer 11. Connected along the distal end of each of the edge panels 19 by means of a score line juncture 20, which may be partially incised for easy foldability, is a narrow co-extensive retainer panel 21. Preferably the portions of the retainer panels 21 are slightly narrower than the base panel margins 17 as best seen in FIGS. 3 and 4. Each of the retainer panels 21 has a central cutout providing a substantial gap 23 such that at the opposite sides of the gap the retainer panel has respective coplanar flange extensions. Preferably the gap 23 is of a wide V-shape extending at it's opposite ends short of the respective sides of the flange extensions 22. At their maximum width, the flange extensions 22 are about four times as wide as the edge panels 19. Although the flange extensions 22 are generally of the same size at all four sides of the blank, the flange extensions 22 at two opposite sides are provided with respective side flaps 24 connected thereto along score lines 25 and of substantially the same width as the edge panels 19. The flange extensions 22 on the remaining two sides of the blank preferably have their outer sides slightly oblique toward one another as shown at 27 for neat assembly purposes.

Rapid production line assembly of the two parts of the filter, i.e. the filter medium body layer 11 and the frame 12, is effected as schematically depicted in FIGS. 5, 6 and 7. One of the blanks B taken from a stack (not shown) of the blanks and one of the filter medium body layers 11 taken from a stack of such preformed layers are brought together by supperimposing the layer 11 in centered coextensive relation onto the main panel 13 so that this panel supportingly engages one face of the layer (FIG. 5). Means are then applied to certain of the retainer flanges at opposite sides of the blank B, including the flange extensions 22 at both sides, for securing the frame in assembly with the filter layer 11. To this end, relative movement of the blank B and hot melt glue gun nozzles 28 is effected to provide narrow parallel strips 29 of hot melt adhesive along the inner faces of those retainer panels 21 which will overlap the retainer panels 21 carrying the side flaps 24 in the assembly. At the same time stripes 30 of the hot melt adhesive are applied along the inner faces of the distal margins of the extensions 22 and parallel to the adhesive stripes 29. In a convenient arrangement, the glue gun nozzle 28 are suitable mounted in fixed positions overlying the path of the movement of the blank B and suitably controlled to eject streams 31 of the hot melt adhesive downwardly onto the selected retainer panels and flange extensions substantially as shown in FIG. 5 where the relationship of the blank B and the adhesive applying nozzles 28 is depicted at the trailing end of the advancing blank and filter layer assembly, the direction of movement of the assembly being as indicated by the directional arrow.

Immediately and as rapidly as possible after application of the adhesive stripes 29 and 30, completion of the assembly is effected by folding up the edge panels and retainer panels into their final disposition in the assembly. This is effected first as shown in FIG. 6 by folding up against the contiguous edges of the filter layer 11 the edge panels 19 which carry the retainer panels having the side flaps 24. The retainer panels 21 and their flange extensions 22 along the folded up edge panels 19 are then folded over onto the filter layer 11, substantially as shown at the left in FIG. 6, with the side flaps 24 turned down so that their free ends engage the main panel 17 as reinforcing braces for the extension flanges 22 to which they are attached as shown in FIGS. 3 and 6. Although in FIG. 6, the folded panels 19, 21 and 24 are shown fully folded at the left and only partially folded at the right, that is only for illustrative purposes. It should be understood that in actuality, the panels at both opposite sides of the assembly will preferably be folded over simultaneously.

As the final steps in completing assembly of the filter, as shown in FIG. 7, the remaining narrow edge panels 19 are folded up against the contiguous edges of the filter layer 11 and the folded down flap flanges 24, and the retainer panels 21 and the flange extensions 22 are folded over into overlapping relation to the adjacent marginal portions of the layer 11 and the underlying portions of the already folded flange extensions 22. This results in the by now tacky adhesive stripes 29 adhering to the subject side portions of the underlying retainer panels 21 and flange extensions 22 and the underlying marginal portions of the filter layer 11. Concurrently with this securing of the overlapping flange extensions 22 is effected by contact of the adhesive stripes 30 with the subjacent flange extensions 22. Tackiness of the adhesive stripes 29 and 30 will have progressed to the point where pressure applied to the adhesive-carrying panels and flange extensions toward and against the subjacent retainer panels and flange extensions and the filter layer causes thorough, tenacious adherence, retaining the adhesively secured parts against separation. It will be understood that the character of the hot melt adhesive and the thickness of the respective adhesive stripes 29 and 30 will be reasonably controlled to attain the desired degree of tackiness in the sequential time interval between application of the stripes to the blank B and the folding over of the adhesive carrying panels and flange extensions into the final assembled, secured relation in the assembly. Further the setting rate of the adhesive is selected and controlled so that immediately upon completion of the assembly and pressure contact of the overlapping panels and flange extensions there is a sufficient setting of the adhesive to maintain a firm bond which will resist normal tensions or stresses in the assembly tending to pull the adhesively secured parts apart. The dual, spaced lines or stripes of adhesive 29 and 30 securing the overlapping flange extensions 22 together provides a dual bond (FIGS. 3 and 7) contributing to effectiveness of the attachment of parts and the frame reinforcing the filter layer retaining efficiency of the secure flange extensions 22 at the corners of the filter unit.

After the assembly has been completed, the overlapping secured flange extensions 22 and retainer flanges 21 supplemented by bonding of the margins along two sides of the filter layer 11 to the frame (FIGS. 4 and 7), assure thorough retention of the filter layer 11 in the assembly against either being pulled away or being blown out of position by the pressure of air being filtered. It will be apparent, of course, that because of the continuous baffle rim provided by the retainer panels 21 over all edges of the filter layer 11, direct access of air pressure to the edges of the filter layer 11 will be blocked at the open face of the filter. The continuous rim provided by the solid continuous margins 17 of the main panel 13 cooperating with the retainer panels 21 further prevent tendency of the air pressure to escape past the edges of the filter layer.

By having the flange extensions 22 along each of the retainer panels 19 spaced by the respective V-recesses or notch-outs 23 any tendency for the retainer panels to deflect outwardly under mechanical or air pressure imposed stress is alleviated. Further, in the assembly, the notch-out gaps 23 increase the effective open-face air-receiving area of the filter layer 11.

In order further to enhance the filtering efficiency of the filter 10, the flange extensions 22 are provided with air hole means desirably comprising a maximum area air hole 32 through the maximum area of each of the flange extensions and clear of the adhesive stripes 29 and 30 and so located that when the flange extensions 22 are in the final assembly overlapping relation these air holes coincide in substantially perfect alignment to provide a continuous large area air passage. In the remaining diminishing areas of each of the respective flange extensions 22, progressively smaller air holes 33 and 34 are provided. It will be apparent that the air holes 32, 33 and 34 significantly contribute to the air filtering capacity of the filter by exposing significant areas of the air-receiving face of the filter layer 11 in addition to the open face area inside the retainer flange extensions 22.

As best seen in FIG. 1, by having the outermost of the extension flanges 22 provided with the canted edges 27, such edges diverging away from the adjacent edges of the filter unit provided by the edge panels 19, freedom is assured from possible overhanging or catching edges or interference with reception in a filter housing in which the filter may be installed.

It will be understood that variations and modifications may be effected without departing from the spirit and scope of the novel concepts of this invention.

We claim as our invention:

1. An air filter having a porous filter medium body layer of substantial thickness, said filter layer having a plurality of angularly related edges defining corner areas of the layer, said layer being supported in a complementary unitary frame folded up from a single blank of sheet material, the frame comprising:

perforated main panel supportingly engaging one face of said filter layer and having boundaries substantially coextensive with the edges of the filter medium layer;

a respective folded up narrow edge panel of substantially the same width as the thickness of the filter layer being joined on a fold line along each boundary of said main panel, and each of said edge panels being disposed in face-to-face contiguous relation to the edge of the filter layer nearest to it;

a narrow respective retainer panel joined along a fold line to the distal end of each of said edge panels, and said retainer panels overlying said filter layer;

each of said retainer panels having a central cutout providing a substantial gap such that at the opposite sides of the gap the retainer panel has respective coplanar flange extensions;

said flange extensions of contiguous retainer panels being in overlapping relation to one another over said corner areas of the filter layer; and means securing said overlapping flange extensions to one another.

2. A filter according to claim 1, wherein said gaps are of generally V-form and are spaced from the outer sides of the flange extensions, the maximum width of the flange extensions being adjacent to said outer sides.

3. A filter according to claim 1, wherein certain of the overlapping flange extensions lie between the filter layer and others of the flange extensions, and further including flap flanges connected along outer sides of said certain flange extensions, said flap flanges being of a width substantially equal to the width of said edge panels and folded down between the contiguous edge of the filter layer and the adjacent edge panel and with the distal ends of the flap flanges contiguous to said main panel.

4. A filter according to claim 1, including means securing overlapping portions of the retainer to one another.

5. A filter according to claim 4, wherein said means securing said overlapping flange extensions to one another and said means securing said overlapping portions of the retainer panels comprise respective stripes of adhesive.

6. A filter according to claim 5, wherein said stripes of adhesive are substantially spaced apart, and said flange extensions have air holes of substantial area therethrough located between said adhesive strips.

7. A filter according to claim 1, wherein said flange extensions have air holes therethrough.

8. A filter according to claim 7, wherein said flange extensions have portions thereof which are in overlapping relation and remaining portions which are free from overlap, said overlapping portions having matching air holes in registration, said remaining portions having additional air holes therethrough.

9. A filter according to claim 1, wherein certain of said retainer panels have stripes of adhesive therealong bonding the filter body layer to said certain retainer panels.

10. A filter according to claim 9, wherein said stripes of adhesive also bond overlapping portions of the retainer panels to one another.

11. An air filter according to claim 1, wherein some of the overlapping flange extensions are superimposed on other of the overlapping flange extensions and the superimposed flange extensions have slanted edges extending inwardly toward the gap of the retainer panels having the slanted edges.

12. A method of making an air filter, comprising:
bringing together a porous filter medium body layer of substantial thickness and having a plurality of angularly related edges defining corner areas of the filter layer, and a complementary supporting unitary frame adapted to be folded up from a single blank of sheet material, including placing one face of the layer in supporting engagement with a perforated main panel of said frame having boundaries substantially coextensive with the edges of the filter medium layer;
folding up into contiguous relation to the respective edges of the filter layer narrow edge panels of substantially the same width as the thicknessof the filter layer and joined on a fold line along each boundary of said main panel;
folding a narrow respective panel joined along a fold line to the distal end of each of said edge panels into overlying relation to said filter layer;
each of said retainer panels having a central cutout providing a substantial gap such that at the opposite sides of the gap the retainer panel has respective coplanar flange extensions; overlapping said coplanar flange areas of the filter layer; and flange extensions of contiguous retainer panels to each other and over said corners said areas each other and over said corner said areas securing said overlapping flange extensions to one anther.

13. A method according to claim 12, wherein said flange extensions have a flap flanges and said method includes folding said flap flanges along outer sides of certain of the flange extensions into position between the contiguous edge of the filter layer and the adjacent edge panel, and positioning the distal ends of the flap flanges contiguous to said main panel.

14. A method according to claim 12, comprising effecting said securing by supplying said overlapping flange extensions with stripes of adhesive.

15. A method according to claim 14, wherein said flange extensions have air holes of substantial area and said method further comprises applying said stripes of adhesive substantially spaced apart and at opposite sides of said air holes.

16. A method according to claim 12, comprising placing in registration matching air holes in said flange extensions.

17. A method according to claim 12, including applying stripes of adhesive along certain faces of the retainer panels and pressing the faces against the filter body layer and thereby adhesively bonding the filter layer to said certain retainer panels.

18. A method according to claim 17, wherein portions of adjacent retainer panels overlap and said method further comprises applying said stripes of adhesive also on the overlapping portions of the retainer panels and thereby bonding such overlapping portions of the retainer panels to one another.

19. A method according to claim 12, comprising, before folding up said edge panels and folding said retainer panels, effecting relative movement of the filter body layer and said blank of sheet material as an assembly relative to adhesive stripe applying nozzles and thereby applying stripes of adhesive along certain of said retainer panels and their flange extensions.

* * * * *